United States Patent [19]
Cook

[11] 3,928,703
[45] Dec. 23, 1975

[54] PROCESS FOR COATING A SUBSTRATE WITH A FLUORINATED ORGANIC POLYMER AND PRODUCT THEREOF

[75] Inventor: John Ransom Cook, Riegelsville, Pa.

[73] Assignee: Chemical Fabrics Corporation, Bennington, Vt.

[22] Filed: Dec. 10, 1973

[21] Appl. No.: 423,064

Related U.S. Application Data

[63] Continuation-in-part of Ser. No. 255,995, May 23, 1972, abandoned.

[52] U.S. Cl. ............... 428/255; 427/375; 427/381; 427/390; 427/412; 428/256; 428/262; 428/268; 428/271; 428/325; 428/337; 428/422
[51] Int. Cl.² ................... B05D 5/00; D06M 15/32
[58] Field of Search ............ 117/76 T, 166, 161 UF, 117/103, 65; 427/375, 381, 390, 412; 428/256, 262, 268, 271, 325, 337, 422

[56] References Cited
UNITED STATES PATENTS

| | | | |
|---|---|---|---|
| 2,539,329 | 1/1951 | Sanders | 117/65 |
| 2,686,767 | 8/1954 | Green | 117/132 CF |
| 2,710,266 | 6/1955 | Hochberg | 117/103 |
| 2,717,220 | 9/1955 | Fay | 117/161 UF |
| 2,768,925 | 10/1956 | Fay | 117/132 CF |
| 2,843,502 | 7/1958 | Fay | 117/132 CF |
| 2,946,763 | 7/1960 | Bro et al. | 117/161 UF |
| 3,015,604 | 1/1962 | Hochberg | 117/132 CF |
| 3,340,222 | 9/1967 | Fang | 117/132 CF |
| 3,473,952 | 10/1969 | McFadder | 117/132 CF |
| 3,480,461 | 11/1969 | Lynge | 117/132 CF |

FOREIGN PATENTS OR APPLICATIONS 977,430   9/1974   Italy

Primary Examiner—Ralph Husack
Attorney, Agent, or Firm—Brumbaugh, Graves, Donohue & Raymond

[57] ABSTRACT

A substrate is coated with a smooth, continuous coating of a fluorinated organic polymer containing spherical beads, which have a maximum diameter of 25 microns, and are capable of withstanding the fusion temperature of the polymer. The coating is applied from a suspensoid and is fused to form a coated, non-porous substrate which is free of mud cracks or pinholes, thereby eliminating weathering effects and providing a more abrasion-resistant material. The substrate may be relatively thick and may have a relatively loose weave for strength and flexibility in the final coated product.

14 Claims, No Drawings

PROCESS FOR COATING A SUBSTRATE WITH A FLUORINATED ORGANIC POLYMER AND PRODUCT THEREOF

This is a continuation in part of my earlier filed copending application, Ser. No. 255,995, filed May 23, 1972 now abandoned.

The present invention is a process for coating substrates with fluorinated organic polymers, such as polytetrafluoroethylene and fluorinated ethylene-propylene polymers, and the resulting non-combustible, heat- and weather-resistant products. More particularly, it relates to a process for preparing substrates, which may be relatively thick and of loose weave, coated with a layer or layers of organic polymers containing spherical beads of high fusion temperature for use in making coated, non-porous products of strength and flexibility.

When fabrics, such as woven fiberglass, are coated with fluorinated organic polymers to improve the chemical, electrical, and physical properties of the glass fabric, the drying and fusing of the coating normally results in a product having mud cracks and pinholes in the coating. These mud cracks and pinholes allow weathering of the product to proceed at an accelerated rate. One way to eliminate mud cracks or pinholes is to weave or mat the fibers of the fabric very closely. Cracks in the final coating generally occur with fairly wide openings in the fabric, since the critical cracking thickness of the polymers used in the coating, such as polytetrafluoroethylene, is quite low, e.g., ½ – 1 mil. Unfortunately, fabrics having a closer weave or a tightly matted construction have a lower trapezoidal tear strength and thereby undesirably affect the flexibility of the final product.

The formation of mud cracks and pinholes can be prevented by applying the polymer coating in a series of very thin layers, each layer being separately fused. This technique has been found too costly for practical commercial application and, moreover, it cannot be used with substrates thicker than 3 mils. Examples of such processes are described in Fay U.S. Pat. No. 2,768,925 and Hochberg U.S. Pat. No. 2,710,266.

Calendering has also been used successfully to eliminate mud cracks or pinholes in fluorinated polymer-coated or impregnated substrates. An example of such a process is described in Sanders U.S. Pat. No. 2,539,329, but this method is undesirable since it requires additional, costly apparatus.

Attempts have also been made to eliminate undesirable mud cracks or pinholes by applying aqueous solutions of fluorinated ethylene polymers with water-soluble silicates. In Hochberg U.S. Pat. 2,710,266, for example, polytetrafluoroethylene and an alkali metal silicate are coated into a glass fabric. The soluble metal silicates, while they do eliminate mud cracks and pinholes to some extent, do not provide the desired tensile and tear strengths.

The Fay U.S. Pat. No. 2,717,220 uses an aqueous suspension of a fluorinated ethylene polymer and particulate cryolite to improve tear strength. The addition of cryolite does not, however, result in the alleviation of the mud cracks and pinholes which form during preparation of the coated material.

Finally, the Fay U.S. Pat. No. 2,843,502 discusses use of a primary and ancillary wetting agent to give a polytetrafluoroethylene coating composition having improved bridging properties when applied to open weave fabrics, but does not discuss the elimination of mud cracks or pinholes in the dried coating.

The present invention includes a process for applying an adherent, smooth, continuous coating comprising a fluorinated organic polymer on an inorganic or organic substrate to provide a non-combustible, weather- and heat-resistant coated product. The process broadly comprises applying to the substrate a mixture of fluorinated organic polymer and spherical beads which are capable of withstanding the fusion temperature of the polymer as either a single layer or as a series of layers and fusing the resulting coated substrate to form a coated material. The major portion of the spherical beads should have a diameter less than 25 microns. The process is preferably carried out by first preparing a suspensoid coating composition containing the fluorinated polymer and the spherical beads, which, preferably, are capable of remaining in suspension during the time it takes to prepare, apply, and fuse the coating composition, and applying the suspensoid by known techniques to the substrate. The wet coated substrate is then heated to evaporate the suspensoid liquid and the coating is fused to the substrate. The coating is adherent, smooth, and continuous and is free from mud cracks and pinholes. The product itself has improved tensile and tear strengths.

The presence of the spherical beads in the dried layer gives a much more abrasion-proof coating on the fabric then would be obtained using the fluorinated polymer alone, and also permits coating of thicker substrates having a wider weave construction than is ordinarily possible. The presence of the spherical beads also insures that the final coating, upon drying and fusion, will not develop mud cracks or pinholes which would accelerate weathering of the article.

Solid or hollow spherical glass beads are the preferred spherical beads for use in the present invention. The use of glass spheres has been suggested in the manufacture of porous, felt-like, fibrous polytetrafluoroethylene products, as described in Hochberg U.S. Pat. No. 3,015,604, but has not been suggested for use in forming solid, coated materials which are free from mud cracks or pinholes.

The present invention can be used to coat any inorganic or organic substrate which can withstand the fusion temperature of the fluorinated organic polymer with which it is to be coated. Suitable substrates include fiberglass, asbestos, and wire cloth. The substrate may be either a woven fabric or may be of a matted construction. It may have a thickness ranging from 6 to 20 mils or more and can have openings as large as about 12 mils.

Suitable fluorinated organic polymers which can be used in practicing the present invention include polytetrafluoroethylene, fluorinated ethylene-propylene polymers, such as those described in Bro et al. U.S. Pat. No. 2,986,763, and any other polymers having a critical cracking thickness which must be increased to bridge a gap of more than 1 mil.

The substrate may be initially treated with silicone oil, as described in Fay U.S. Pat. No. 2,768,925, as an interior layer in the final construction to prevent the fluorinated organic polymer from penetrating into the substrate. This optional pre-treatment helps maintain the substrate's flexibility and improves the trapezoidal tear strength of the coated product. A 33% solution of a silicone (e.g., polydimethyl siloxane) in xylene can be applied, followed by curing at 450°F. for about 5 minutes. The application can be made by doctor knife, doctor roller, reverse roll doctor, and any other known technique in the art of coating surfaces with liquid coating compositions. Besides silicone oil, the fabric can also be pre-treated with hydrocarbon oils or any other substance that keeps the yarn bundle from getting wet.

The substrate can also be optionally pre-treated by application of a single layer of polytetrafluoroethylene followed by fusing this layer.

If the substrate is fiberglass, it should be pre-cleaned with heat to remove the sizing normally contained in glass fabrics. This will help to prevent ultraviolet deterioration of the fluorinated organic polymer in the coated product.

After the substrate has undergone any necessary pre-treatment, it is then coated with layers of the fluorinated organic polymer in a suspensoid which includes a filling of solid or hollow spherical glass beads, the major portion of which have a diameter of about 25 microns or less, preferably less than 10 microns. The suspensoid should have a solids content of about 20% to 60% by weight and a sufficient amount of glass beads to provide a product having 5% to 50% by weight glass beads. The glass beads should preferably have about the same specific gravity as the polymer to provide a stable suspensoid from which the glass beads will not precipitate.

The number of layers of the fluorinated organic polymer applied to the substrate depends upon the weight of the final coating, the weight of the substrate, and the intended use of the coated product. The thickness of the coatings, especially the final coating, depends upon the intended use of the object. A total 5-mil thickness on each side of the material has been found to be preferred for construction materials. Individual layers of the coating ranging in thickness from 0.0005 mil to 0.001 mil can be formed.

The coating may initially be dried at a temperature of about 300° to 400°F. to remove excess water, followed by fusing at the proper fusion temperature for the fluorinated polymer coating material. The fusion temperature for polytetrafluoroethylene is about 621°F. A temperature of 750°–770°F. will fuse a polytetrafluoroethylene coating in about one minute. If desired, the removal of excess water can be accelerated by raising the temperature of the initial pre-heating or drying step to about 500°–600°F.

If desired, a final exterior coating of a pure, fluorinated ethylene or fluorinated ethylene-propylene polymer may be applied to facilitate rapid heat sealing at lower temperatures of the coated product at the application site.

The coated products formed by the present invention are smooth, adherent, and non-porous and have a fluorinated organic polymer coating which does not have or does not develop mud cracks or pinholes. These products are unburnable, will not generate smoke, and do not support combustion. They are weather-resistant for a period as long as twenty years, are impermeable to the effects of water, and are reasonably flexible for the end use intended. Moreover, these products are abrasion-resistant. The spherical beads, e.g., glass beads, present in the interstices of the fibers of the substrate, provide a material which has all the aforementioned desirable physical properties and chemical stability combined with non-porousness and, therefore, provide a good construction material.

Although a fiberglass substrate and a coating of polytetrafluoroethylene are preferred, any suitable combination of materials can be used to obtain a coated material having a trapezoidal tear strength of about 10%–15% of the tensile strength. A tensile strength of 800 pli for tension structures and 400 pli for air roof constructions may be achieved without difficulty with the preferred polytetrafluoroethylene-coated fiberglass material.

Accordingly, the products of the present invention can, in general, be used for any purpose where non-porous materials, which will withstand high vacuum, are required. Typical uses would include non-porous, heavy duty industrial belts, fireproof construction materials, and release sheets for the plastic panel industry. In addition, materials prepared according to the invention can be used in preparing durable, decorative fabrics.

Hollow beads are also used to improve the insulating values of the fabric designed for architectural uses. A combination of hollow and solid beads, or all hollow beads, improves the insulating value of the fabric, thus reducing the costs for heating, air-conditioning equipment, and other operating costs.

The invention is further illustrated by the following examples:

EXAMPLE 1

Plain weave glass fabric (thickness—0.17 inch ± 10%; weight—11.5 ± 10% oz./sq. yd.) with a yarn warp of 150 2/4 and a yarn filling of 150 2/4, woven to a warp and fill count of 20 × 18 (weave opening approximately 8–12 mils), was heat cleaned by being run through an oven at a temperature of 800°F. at a speed of 3 feet per minute. The glass fabric was then pre-treated with one coat of a silicone-water mix comprising 2 quarts of silicone and 5 gallons of water. The coating of the fabric was accomplished by continuously running the fabric through a bath containing the silicone-water mix. The coated glass fabric was then passed at a speed of 4 feet per minute through an oven at 450°F. to cure the coating. After these two pre-treatment steps were performed, the fabric was coated with a single coat of a 60% by weight solids polytetrafluoroethylene suspensoid having a specific gravity of 1.4 by passing the fabric through a bath containing the suspensoid. It was then passed through a low temperature zone of 450°F. and a second higher temperature zone of 750°F. at a speed of 4 feet per minute to dry and fuse the coating.

After the polytetrafluoroethylene coating was applied, about five or six coats of a mixture comprising 2 gallons of a 60% solids polytetrafluoroethylene-water suspensoid and 2 pounds of glass reinforced spheres were coated onto the fabric. Eighty percent of the glass spheres had a diameter of less than 20 microns. The speed of transit of the fabric through the mix was 4 feet per minute and doctor bars were used on each side of the fabric. A maximum temperature of about 750°F. was used to dry and fuse these coatings after they had been applied.

A final coat of a suspensoid containing a fluorinated ethylene-propylene polymer, as described in Bro et al. U.S. Pat. No. 2,946,763, at a specific gravity of 1.4, was applied to the fabric which moved through a dip bath containing the suspensoid. The coating was dried and fused by subjecting the coated article to a temperature of 720°F.

The final product had a warp breaking strength of 550 lbs./in. of width and filling breaking strength of 510 lbs./in. of width.

EXAMPLE II

Plain weave glass fabric having a yarn warp of 150 1/2 and a yarn filling of 150 1/2 (thickness—0.0080 inch ± 10%; weight—6 ± 10% oz./sq. yd.), woven to a warp and fill count of 40 × 32 (weave opening approximately 1–3 mils), was heat cleaned at 800°F. by passing it through an oven at a speed of 3 feet per minute. The fabric was then coated with a mixture of 2 quarts of silicone and 5 gallons of water by being run through a dip bath at a speed of 4 feet per minute and was thereafter heated to 450°F. to dry and fuse the coating. After this coating had been applied and fused, a single coating of a 60% solids polytetrafluoroethylene suspensoid having a specific gravity of 1.4 was coated onto the fabric by passing it at a speed of 4 feet per minute through a dip bath of the suspensoid and, subsequently, through temperature zones of 450° and 750°F. at the same speed to dry and fuse the coating.

After these preliminary treatments, five or six coats of a mixture containing 2 gallons of a 60% solids polytetrafluoroethylene suspensoid and 2 pounds of glass reinforced spheres were applied to the fabric by passing the fabric through a dip bath at a speed of 4 feet per minute and, after each coating, through a temperature zone having a top temperature of 750°F. at the same speed until the coating was fused. Approximately half of the glass beads had a diameter of less than 10 microns. The last application of this mixture of organic polymer and glass spheres was performed with a reduction in the fusing temperature to 580°F.

A final exterior coat of a mixture of fluorinated ethylene-propylene polymers and water (1.4 specific gravity) was applied by dip coating the fabric and passing the coated fabric at 4 feet per minute through a temperature zone of 720°F.

The final product had a warp breaking strength of 250 lbs./in. of width and a filling breaking strength of 250 lbs./in. of width.

EXAMPLE III

Plain weave glass fabric (thickness—0.24 inch ± 0.003; weight—18 ± 10% oz./sq. yd.) having a yarn warp of 150 3/4 and a yarn filling of 150 3/4, woven to a warp and fill count of 20 × 18 (weave opening approximately 4–7 mils), was heat cleaned at 800°F. by passing it at 3 feet per minute through an appropriate heating device. The fabric was then coated once with a mixture of 2 quarts of silicone oil and 5 gallons of water and dried by passage through an oven at 450°F. at a speed of 4 feet per minute. The fabric was then coated with a single coating of a 60% solids polytetrafluoroethylene suspensoid (1.4 specific gravity) by passing the fabric at a speed of 4 feet per minute through a dip bath and through successive temperature treatments of 450° and 750°F. at the same speed to dry and fuse the coating.

After these treatments, the fabric was coated either five or six times with 2 gallons of a 60% solids polytetrafluoroethylene suspensoid containing two pounds of glass reinforced spheres, 80% of which had a diameter of less than 20 microns. The speed of transit of the glass fabric through the dip bath containing this suspensoid was 4 feet per minute and the top temperature was 750°F. Doctor blades were used on each side of the fabric. The final application of this suspensoid was followed with the drying and fusion taking place at a reduced temperature of 580°F.

A final single coating of a mixture of a fluorinated ethylene-propylene polymer (1.4 specific gravity) was applied to the fabric by dip bath treatment with the fabric speed through the bath being set at 4 feet per minute. The fabric was then passed through a temperature zone of 720°F. at the same speed to dry and fuse the coating. The coated article had a warp breaking strength of 850 lbs./in. of width, minimum, and a filling breaking strength of 850 lbs./in. of width, minimum.

I claim:

1. A method for coating a substrate selected from the group consisting essentially of woven and non-woven fiberglass, asbestos, and wire cloth with a fluorinated organic polymer, wherein the substrate contains openings as large as about 12 mils, which comprises the steps of:
   a. preparing a liquid suspensoid containing the fluorinated organic polymer and spherical beads, the major portion of which have a maximum diameter of 25 microns or less and which are capable of being suspended in the suspensoid and will withstand the fusion temperature of the polymer;
   b. applying the suspensoid to the substrate to form a coated substrate material;
   c. evaporating the suspensoid liquid medium; and
   d. heating the coated substrate to at least the fusion temperature of the polymer to form a dried non-porous coated product.

2. A method according to claim 1 wherein the spherical beads are glass beads.

3. A method according to claim 1 wherein the beads comprise about 5–50% by weight of the coated product.

4. A method accoding to claim 1 wherein the substrate is about 6 to 20 mils thick.

5. A method according to claim 1 wherein the substrate is pre-treated with silicone oil.

6. A method according to claim 1 wherein the substrate is pre-treated by application of a layer consisting essentially of polytetrafluoroethylene.

7. A method according to claim 1 wherein the fluorinated organic polymer is selected from the group consisting of polytetrafluoroethylene and fluorinated ethylene-propylene polymers.

8. A method according to claim 7 wherein the fluorinated organic polymer is polytetrafluoroethylene.

9. A method according to claim 1 wherein the spherical beads have a maximum diameter of less than 10 microns.

10. A smooth, non-porous product comprising a substrate selected from the group consisting essentially of woven and non-woven fiberglass, asbestos, and wire cloth having a coating which comprises a fluorinated organic polymer and spherical beads, the major portion of which have a maximum diameter of 25 microns or less and which can withstand the fusion temperature of the polymer, said substrate having openings in its structure as large as about 12 mils.

11. A product according to claim 10 wherein the substrate is about 6 to 20 mils thick.

12. A product according to claim 10 wherein the fluorinated organic polymer is selected from the group consisting of polytetrafluoroethylene and fluorinated ethylene-propylene polymers.

13. A product according to claim 12 wherein the fluorinated organic polymer is polytetrafluoroethylene.

14. A product according to claim 10 wherein the spherical beads have a maximum diameter of less than 10 microns.

* * * * *

UNITED STATES PATENT AND TRADEMARK OFFICE
CERTIFICATE OF CORRECTION

PATENT NO. : 3,928,703
DATED : December 23, 1975
INVENTOR(S) : John Ransom Cook

It is certified that error appears in the above-identified patent and that said Letters Patent are hereby corrected as shown below:

Col. 1, line 30, "coating" should read --coatings--;
Col. 1, line 55, "into" should read --onto--;
Col. 2, line 8, after "mixture of" insert --a--.

Signed and Sealed this eighteenth Day of May 1976

[SEAL]

Attest:

RUTH C. MASON
Attesting Officer

C. MARSHALL DANN
Commissioner of Patents and Trademarks